United States Patent [19]
Litherland

[11] 3,822,068
[45] July 2, 1974

[54] PACKING ASSEMBLIES
[75] Inventor: James Albert Frazier Litherland, Walsall, England
[73] Assignee: B.A.L. Limited, Halesowen, England
[22] Filed: Dec. 15, 1972
[21] Appl. No.: 315,589

[30] Foreign Application Priority Data
Dec. 31, 1971 Great Britain .................. 60961/71

[52] U.S. Cl..................... 277/208, 277/24, 277/190
[51] Int. Cl............................................. F16j 15/32
[58] Field of Search ............ 277/208, 207, 210, 24, 277/190

[56] References Cited
UNITED STATES PATENTS
2,322,867  6/1943  Meyer............................ 277/207 X
2,489,715  11/1949  Mark, Jr. et al................ 277/208 X
2,997,318  8/1961  Lansky et al. .................. 277/210
3,554,569  1/1971  Gorman............................ 277/207

Primary Examiner—Samuel B. Rothberg

[57] ABSTRACT

The invention is concerned with a fluid packing assembly comprising a sealing member having a sealing lip for co-operation with the surface of a relatively movable member so as to form a fluid seal therewith. The sealing member is provided with a roughened zone adjacent to the sealing lip, the roughened zone acting to disturb the fluid film on the surface of the relatively movable member in advance of the contact of the surface with the sealing lip.

6 Claims, 2 Drawing Figures

PACKING ASSEMBLIES

This invention relates to fluid packing assemblies and of the kind comprising a sealing member having on at least one of its surfaces a sealing lip for co-operation with the surface of a relatively movable member to define a fluid seal therebetween.

Such assemblies are widely used but it is found that in certain circumstances fluid leakage under pressure occurs between the sealing lip and the surface of the member. Investigation of this problem has led to the belief that the finish of the surface with which the lip co-operates contributes to the leakage. The surface finish must in order to minimise wear of the lip, be good but it is found that if the surface finish is very good then there is a tendency for leakage to occur. The reason for this is not fully understood but it is thought that with a very good surface finish the lip is not able to break the fluid film on the surface so that leakage occurs.

The object of the invention is to provide a fluid seal assembly in a simple and convenient form.

According to the invention in a fluid packing assembly of the kind specified the sealing ring is provided with a roughened zone adjacent said sealing lip, said roughened zone acting to disturb the fluid film on said surface in advance of the contact of the surface with the sealing lip.

One example of a packing assembly in accordance with the invention will now be described with reference to the accompanying drawings in which.

Figure 1:
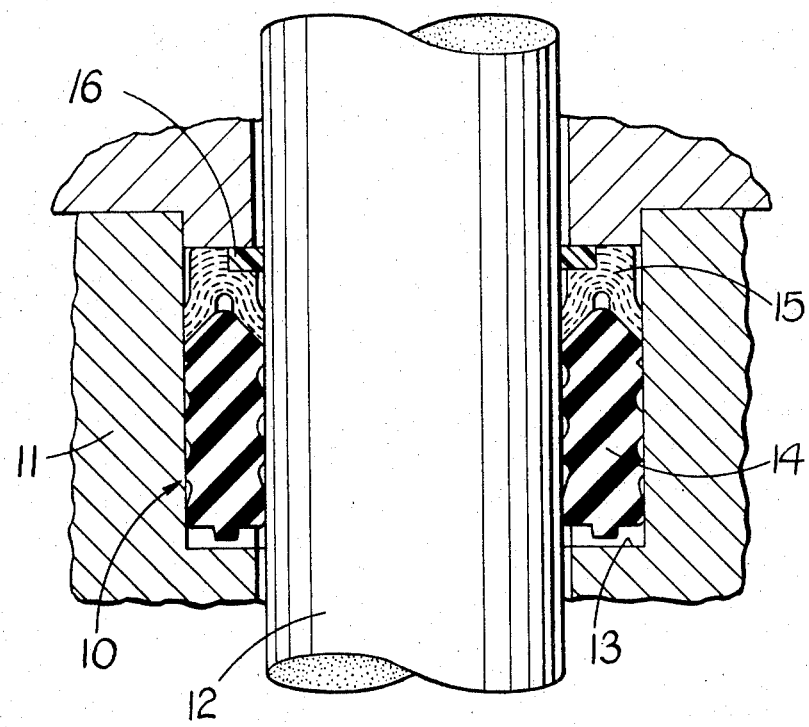
FIG. 1 is a sectional side elevation of the packing assembly shown in use.

With reference to the drawings there is shown a fluid packing assembly 10 mounting within a portion of an end closure 11 of a cylinder, the cylinder having a piston not shown mounted upon a piston rod 12 which extends through an aperture in the end closure. Connections not shown are provided and through which liquid under pressure may be admitted to the opposite ends of the cylinder.

Defined in the end closure 11 is an annular recess 13 in which is mounted the packing assembly 10. This comprises an annular sealing ring 14 formed from a rubber or like material. One end surface of the ring is of convex form and in contact with this surface is a fabric re-inforced ring 15 which is recessed to accommodate an anti-extrusion ring 16 formed from synthetic resin material.

On the inner and outer peripheral surfaces of the sealing ring are formed sealing lips 17 which in the case of the lips on the outer peripheral surface co-operate with a wall of the recess 13 to define a liquid seal therewith. The sealing lips on the inner peripheral surface co-operate with the surface of the piston rod 12 also to define a liquid seal. The seals thus formed are effective to prevent leakage when they are subject directly to the high pressure liquid supplied to the adjacent end of the cylinder and also when they are subjected to the lower pressure of liquid which pertains when liquid is supplied to the opposite end of the cylinder. In known manner the lips 17 on the inner and outer surfaces are staggered in the axial direction.

Figure 2:
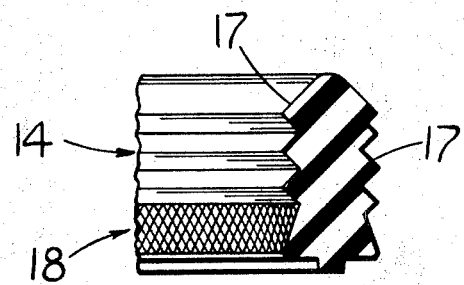
FIG. 2 is a side elevation of part of the packing assembly.

As explained earlier in the specification under certain conditions there is a risk of liquid leaking past the packing assembly. This occurs when the pressure to which the seal is subjected is fairly low so that there is little pressure actuation of the seal assembly. In order to minimise this leakage a zone 18 on the inner periphery of the seal ring 14 is roughened. This zone is positioned at the end of the sealing ring 14 remote from that end which contacts the fabric reinforced ring 15, i.e., the end which is subjected to the higher pressure. In this manner as the piston rod moves through the packing assembly the liquid film on the surface of the piston rod is disturbed so that the sealing lips 17 can penetrate the film to provide a proper sealing action. Moreover, it will be seen from FIG. 2 that the portion of the sealing ring upon which the roughened zone is formed is flared outwardly from the portion of the ring which carries the sealing ribs. Thereby when the sealing ring is in position the roughened zone of the ring is pressed firmly into engagement with the piston rod.

In the particular example the appropriate surface of the mould in which the sealing ring is made is knurled so that a similar surface finish is impressed upon the ring. Other finishes may however be used with similar effect so long as disturbance of the oil film on the piston rod occurs for instance, the ring may be formed with a plurality of axially extending ribs in the aforesaid zone.

It will be understood that whilst a particular form of packing assembly has been described the invention is applicable to any form of packing in which the sealing lip co-operates with a surface to establish a fluid seal.

I claim:

1. A fluid packing assembly of the kind comprising a sealing member mountable in a groove defined in one of a pair of relatively movable members between which it is required to establish a fluid seal, a sealing lip defined on said sealing member for engagement with the surface of said other of the pair of relatively movable members, a roughened zone formed on said sealing member adjacent said sealing lip, said roughened zone acting to disturb the fluid film on said surface in advance of the contact of the surface with the sealing lip.

2. A fluid packing assembly as claimed in claim 1 in which said roughened zone is positioned on the side of the sealing lip which in use, is exposed to the higher fluid pressure.

3. A fluid packing assembly as claimed in claim 2 in which the portion of the seal member which carries the roughened zone is flared outwardly from the portion of the seal member which carries the sealing lip whereby in use, the roughened zone will be pressed firmly into engagement with said surface.

4. A fluid packing assembly as claimed in claim 3 in which the roughened zone is provided with ribs.

5. A piston cylinder combination comprising a housing, an end closure for the housing and having an aperture therein, a piston rod extending through the aperture, an annular recess defined in the end closure about the piston rod, a packing assembly mounted in the recess, said packing assembly including an annular sealing member, annular sealing lips defined on the inner and outer sides of said sealing member, the sealing lips on the outer side of said sealing member engaging the adjacent wall of the recess and the sealing lips on the inner side of the sealing member engaging with the surface of the piston rod to provide a fluid seal therebetween, and an annular roughened zone defined on the inner side of the sealing member, said roughened zone being positioned at the end of the sealing member which in use is subjected to fluid pressure, said roughened zone acting to disturb the fluid film on the surface of the piston rod.

6. A piston cylinder combination comprising first and second members defining annular cylindrical surfaces between which it is desired to provide a fluid seal, one of said surfaces being defined by the base wall of an annular recess defined in one of said members, a packing assembly mounted in the recess, said packing assembly including an annular sealing member, annular sealing lips defined on the inner and outer sides of said sealing member, said lips co-operating with said surfaces to provide the fluid seal, and an annular roughened zone defined on the side of the sealing member presented to the surface of the other member, said roughened zone being positioned at the end of the sealing member which in use is subjected to fluid pressure, said roughened zone acting to disturb the fluid film on the surface of said other member.

* * * * *